US010581855B1

(12) United States Patent
Donovan et al.

(10) Patent No.: US 10,581,855 B1
(45) Date of Patent: Mar. 3, 2020

(54) SECURED DEVICE MANUFACTURING SELF-TEST

(71) Applicant: Square, Inc., San Francisco, CA (US)

(72) Inventors: David Donovan, Berkeley, CA (US); Michael Lamfalusi, Cupertino, CA (US); John Kelley, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 432 days.

(21) Appl. No.: 15/427,228

(22) Filed: Feb. 8, 2017

(51) Int. Cl.
| | |
|---|---|
| *H04L 29/06* | (2006.01) |
| *G06K 19/06* | (2006.01) |
| *G06Q 20/08* | (2012.01) |
| *G06F 21/57* | (2013.01) |
| *G06F 3/0488* | (2013.01) |
| *G06K 7/14* | (2006.01) |

(52) U.S. Cl.
CPC .......... *H04L 63/10* (2013.01); *G06F 3/0488* (2013.01); *G06F 21/575* (2013.01); *G06K 7/1417* (2013.01); *G06K 19/06037* (2013.01); *G06Q 20/085* (2013.01)

(58) Field of Classification Search
CPC ..... H04L 63/10; G06F 3/0488; G06F 21/575; G06F 3/00; G06K 7/1417; G06K 19/06037; G06Q 20/085
See application file for complete search history.

(56) References Cited

U.S. PATENT DOCUMENTS

| | | | | |
|---|---|---|---|---|
| 5,615,335 A | * | 3/1997 | Onffroy | G11C 29/12 714/25 |
| 6,385,739 B1 | * | 5/2002 | Barton | G06F 11/006 713/189 |
| 7,472,394 B1 | | 12/2008 | Meckenstock et al. | |
| 7,953,989 B1 | * | 5/2011 | Hsiang | G06F 21/572 713/194 |
| 8,600,881 B2 | * | 12/2013 | Nguyen | G06Q 20/20 235/1 R |
| 9,237,465 B1 | * | 1/2016 | Tanner | H04B 5/0031 |
| 9,686,026 B1 | * | 6/2017 | Reed | H04B 17/29 |
| 2005/0171898 A1 | | 8/2005 | Bishop et al. | |
| 2008/0301441 A1 | * | 12/2008 | Calman | G06F 21/56 713/168 |

(Continued)

OTHER PUBLICATIONS

I. Hamzaoglu and J. H. Patel, "Reducing test application time for built-in-self-test test pattern generators," Proceedings 18th IEEE VLSI Test Symposium, Montreal, Quebec, Canada, 2000, pp. 369-375. (Year: 2000).*

(Continued)

*Primary Examiner* — Jung W Kim
*Assistant Examiner* — Sameera Wickramasuriya
(74) *Attorney, Agent, or Firm* — Maynard Cooper & Gale, LLP; Chitra M. Kalyanaraman, Esq.

(57) ABSTRACT

A payment terminal can have a secured test mode. Interfaces of the payment terminal may be secured via various techniques. Self-test input touch inputs may be provided at a user interface to initiate device self-tests. The payment terminal may perform the self-tests, and generate a machine-readable output including device information and results from the self-tests. The payment terminal may display the machine-readable output for scanning by test equipment.

25 Claims, 8 Drawing Sheets

(56) References Cited

U.S. PATENT DOCUMENTS

| | | | |
|---|---|---|---|
| 2011/0089232 A1* | 4/2011 | Kekicheff | G06Q 20/3552 |
| | | | 235/380 |
| 2014/0248853 A1* | 9/2014 | Shipley | H04W 12/06 |
| | | | 455/411 |
| 2015/0006407 A1 | 1/2015 | Lunn et al. | |
| 2015/0324793 A1 | 11/2015 | Guise et al. | |
| 2017/0061168 A1* | 3/2017 | Sundaram | G06K 7/0095 |
| 2018/0026799 A1* | 1/2018 | Pottier | H04L 9/3265 |
| | | | 713/156 |

OTHER PUBLICATIONS

J. Gao, V. Kulkarni, H. Ranavat, L. Chang and H. Mei, "A 2D Barcode-Based Mobile Payment System," 2009 Third International Conference on Multimedia and Ubiquitous Engineering, Qingdao, 2009, pp. 320-329. (Year: 2009).*

Final Rejection dated Jul. 24, 2018, for U.S. Appl. No. 14/752,672, of Smith, M., et al., filed Jun. 26, 2015.

Advisory Action dated Oct. 2, 2018, for U.S. Appl. No. 14/752,672, of Smith, M., et al., filed Jun. 26, 2015.

Non-Final Office Action dated Mar. 15, 2018, for U.S. Appl. No. 14/752,672, of Smith, M., et al., filed Jun. 26, 2015.

* cited by examiner

SECURED DEVICE MANUFACTURING SELF-TEST

BACKGROUND

Consumers provide payment for transactions using a variety of payment methods, such as by swiping a magnetic stripe card through a magnetic card reader, exchanging payment information wirelessly using near field communications (NFC), and dipping a Europay/Mastercard/Visa (EMV) payment card into a payment slot. Many business locations are temporary or mobile, such as food trucks, taxis, service providers, farmers' markets, and temporary "pop-up" shops. Merchants and customers need to be able to interact during transactions regarding the items and services the customer will purchase and to exchange payment information.

Customers and merchants may exchange various types of sensitive information during such transactions. Such information may include a customer's name, date of birth, address, demographic information, loyalty programs, credit card information, a personal identification number (PIN) associated with the customer's payment method, and a variety of additional confidential or unique customer or payment information. For example, a customer may be required to provide payment information such as the customer's unique PIN to receive authorization for a payment transaction and credit card information may be exchanged with payment devices (e.g., magstripe card, EMV card, or NFC payment device). Customer information such as the customer's date of birth, personal address, or shipping information also may be exchanged (e.g., such as with the merchant or a payment method issuer) during the payment transaction.

The sensitive information exchanged during the payment transaction is stored in and communicated through a device, such as a payment terminal. As of a result of its central role in the transaction processing system, the payment terminal is a prime target for third party attackers attempting to access payment information, process fraudulent transactions, and otherwise engage in fraudulent activities or theft. Criminals may attempt to monitor or tamper with the payment terminal, such as by monitoring internal or external signals of the payment terminal, physically tampering with the device to gain access to or modify internal circuitry, or by spoofing communications with interfaces of the device. As an example, attackers may attempt to physically access components of the payment terminal, such as one or more communication lines carrying data or a processor that communicates and processes payment information. Attackers may also attempt to eavesdrop on signals or to modify or spoof payment processing communications by injecting malicious signals into interfaces of the payment terminal.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
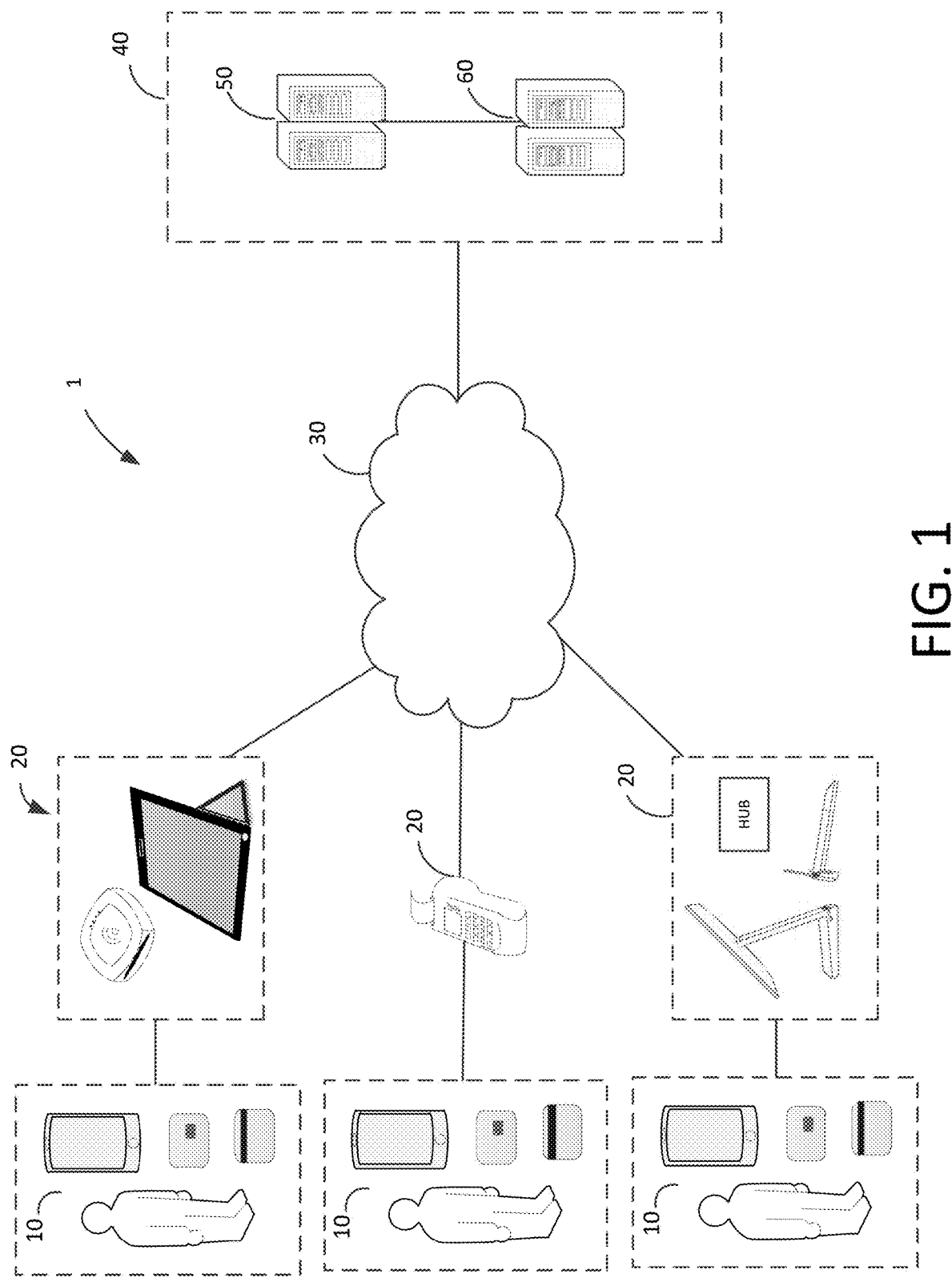
FIG. 1 shows an illustrative block diagram of a payment system in accordance with some embodiments of the present disclosure.

A payment system may have a merchant terminal and customer terminal that facilitate payment transactions, and through these payment transactions, exchange and store sensitive customer information and payment information. The merchant terminal may exchange payment information and customer information with a customer terminal, and further, with remote servers such as bank servers and a payment service system. The customer terminal may receive payment information from a customer's payment device (e.g., from credit card with a magstripe or EMV chip, or a NFC-enabled electronic device) and communicate the payment information to the merchant terminal. The customer terminal and merchant terminal may also facilitate acquisition of customer information such as loyalty programs, customer name, demographics, and other information related to a customer's identity and transaction history. In this manner, the merchant terminal and customer terminal may communicate and exchange a variety of sensitive information when processing payment transactions.

The merchant terminal and customer terminal each may have interfaces where sensitive information may be acquired or exchanged. Examples of such interfaces may include wired interfaces (e.g., a USB interface and an Ethernet interface), wireless interfaces (e.g., for communication via NFC, WiFi, or Bluetooth), and user interfaces (e.g., touchscreens, keyboards, microphones). Each of the interfaces of the merchant terminal and customer terminal may be secured to prevent theft and tampering, for example, by limiting the functionality of the interface or devices for which communication is permitted. Some interfaces may have functionality disabled, such that certain inputs or communication protocols are prohibited. Some interfaces may be secured by monitoring communications and rejecting communications with devices that are not approved (e.g., by an authentication procedure). For example, any input or communication that is not from a restricted list of approved devices may be rejected.

Although securing interfaces of the merchant terminal and customer terminal may protect sensitive customer and merchant information, securing the interfaces also limits a user's ability to retrieve information about the device, such as versions of software installed, self-test data, and diagnostic information, even for proper purposes. For example, a technician servicing a merchant terminal or customer terminal may need to access information about the device in order to verify that its components are to perform maintenance or service. The secured interfaces may prevent many typical interface and diagnostic techniques from being employed.

Instructions stored on the merchant terminal and customer terminal may provide steps for a secured test mode. Processors of the merchant terminal and customer terminal can execute the instructions to run tests, perform diagnostics, retrieve information (e.g., device information or test results), and generate a machine-readable output and a human-readable output. The instructions can be executed by a device to perform various desired device self-tests, including tests for verifying the security measures of merchant terminal and customer terminal (e.g., encryption keys, security certificates, tamper devices, etc.), testing tamper devices, and performing hardware, software, and system diagnostics. A machine-readable output (such as a QR code or a barcode) containing the information from the self-tests may be displayed at a user interface of the merchant terminal and customer terminal. Security of the device's information is preserved by displaying the information in a machine-readable format or only in response to an approved request for a self-test, without transmitting or otherwise communicating the information over the secured interfaces. Test equipment (e.g., a camera or infrared (IR) scanner) may be used to retrieve the information encoded in the machine-readable output and convert it to a human-readable format.

The instructions may allow users to initiate the self-tests or retrieve the machine readable output with self-test inputs. A self-test input may be a set of inputs such as a series of touch inputs provided (e.g., within a predetermined timeframe) at predetermined locations on a touchscreen. Self-tests may begin or results of previously performed self-tests may be displayed when a merchant terminal or customer terminal receives the self-test input.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application. The payment terminal 20 may include more than one payment terminal device, such as when the payment terminal comprises a merchant terminal and a customer terminal for processing payment information.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a dedicated customer terminal, smart phone, or watch operating as a NFC payment device, information about the approved transaction and additional information (e.g., receipts, special offers, coupons, or loyalty program information) may be provided to the NFC payment device for display at a screen of the smart phone or watch or storage in memory.

Figure 2:
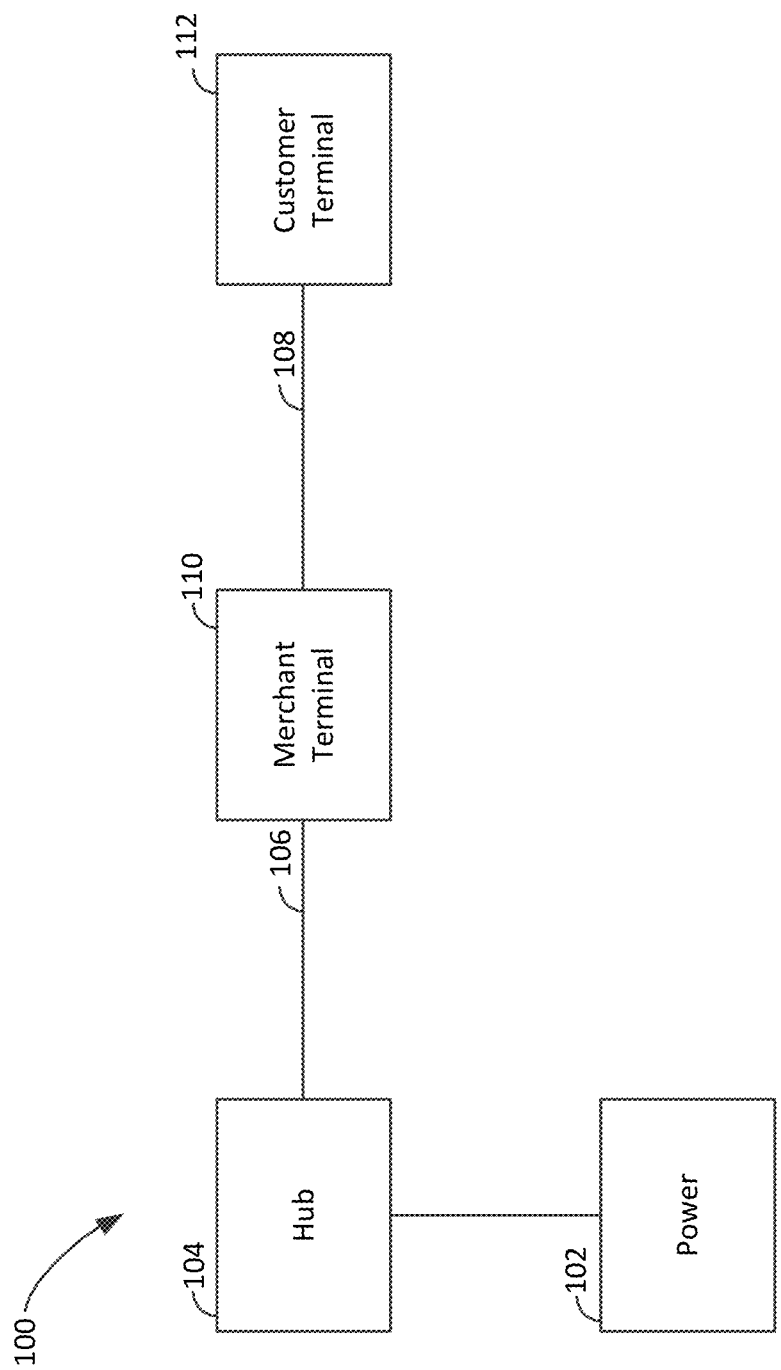
FIG. 2 depicts an illustrative block diagram a power supply, USB hub, merchant terminal and customer terminal of a point-of-sale system in accordance with some embodiments of the present disclosure.

FIG. 2 depicts an illustrative block diagram of a payment system 100 in accordance with some embodiments of the present disclosure. In one embodiment, payment system 100 includes a power supply 102, USB hub 104, USB connector 106, USB connector 108, merchant terminal 110, and customer terminal 112. These components of point-of-sale system 100 facilitate electronic payment transactions between a merchant and a customer.

In an embodiment, the power supply 102 may connect to an AC power source and convert the AC voltage into a DC voltage for use by the components of the payment system 100. A DC voltage (e.g., 12 volts) may be provided to the USB hub 104. USB hub 104 may convert the received DC voltage into a plurality of DC voltages for use in powering circuitry of the USB hub 104. The USB hub 104 allows for the merchant terminal 110 to communicate with a plurality of other USB peripherals, such as a receipt printer, cash drawer, barcode scanner, scale, keyboard, USB-Ethernet dongle/USB MiFi, and other similar peripheral devices. As described herein, the USB hub 104 may also include power supply circuitry that selectively allows the USB hub to provide a power supply signal (e.g., a 12V signal) to merchant terminal 110 via USB connector 106, and via power supply circuitry of merchant terminal 110 and USB connector 108, to customer terminal 112.

The electronic interactions between the merchant and the customer may take place between the merchant terminal 110 and the customer terminal 112. In one embodiment, the merchant terminal 110 supports an interactive computing device that is capable of processing payment information (e.g., encrypted payment card data and user authentication data) and transaction information (e.g., purchase amount and point-of-purchase information) with the customer terminal 112 and a remote payment server (not depicted). The merchant terminal 110 may include a plurality of interfaces as described herein in order to receive and provide power, to communicate with the customer terminal 112 and other devices such as a remote payment server, and to physically interface with other components such as the customer terminal 112. The interactive computing device of the merchant terminal 110 may execute the software instructions of a point-of-sale application to manage user interactions with a merchant, communications with the customer terminal 112, and communications with remote payment servers. The merchant is provided an interface through which the merchant can enter selections of purchased items, access customer information (e.g., loyalty information), check inventory, calculate taxes and fees, and otherwise perform necessary customer service and transaction steps.

The customer terminal 112 may operate as a payment terminal that receives payment information from a customer, and may provide a variety of interfaces to interact with the merchant terminal 110 and a customer. A user interface of the customer terminal 112 may allow the user to interact with the customer terminal 112 in order to interact with the merchant (e.g., select items for purchase, answer queries, confirm purchases, provide PINS and signatures, etc.), receive payment information (e.g., from a swipe card, chip card, or NFC-enabled payment device) from a customer, communicate with the merchant terminal 110 (e.g., via USB connector 108), receive power from merchant terminal 110 (e.g., via USB connector 108), and physically attach to the merchant terminal 110 (e.g., via connecting enclosures of each of the customer terminal 112 and the merchant terminal 110).

Criminals may attempt to steal various sensitive information from merchant terminal 110 or customer terminal 112, such as when an attacker improperly accesses communication interfaces (e.g., USB, Bluetooth, WiFi, Ethernet), payment interfaces (e.g., magstripe, EMV card, or NFC interfaces), internal circuitry (e.g., processors, memory, communication chips, or internal traces and pins), or other resources of merchant terminal 110 or customer terminal 112. Various techniques for tampering with payment terminals, such as merchant terminal 110 and customer terminal 112 have been observed, including both monitoring, physical tampering (e.g., breaking into a payment terminal device) and logical tampering (e.g., signal manipulation). Criminals perform such tampering in hopes of accessing the sensitive information stored at the payment terminal. Such sensitive information can include payment information, transaction information, and customer information, including a customer's personal information, a customer's financial institution and account information, a merchant's private information, and a merchant's financial institution and account information. In some embodiments, such information may be authorization information from a financial institution, such as for facilitating payment transactions using particular payment methods (e.g., credit card using EMV, NFC payment methods). Payment or security information also may be stored, such as PIN entries. Other information may be communicated and stored by merchant terminal 110 and customer terminal 112 in other embodiments.

In some embodiments, interfaces of merchant terminal 110 and customer terminal 112 may be secured using various techniques to prevent unauthorized access to sensitive information, which may be implemented via hardware, software, or a combination thereof. For example, in some embodiments, merchant terminal 110 and customer terminal 112 may secure their respective interfaces that could serve as access points for an attacker (e.g., USB connectors 106 and 108, audio device 212, debug module 214, wired interface 216, wireless interface 218). Example techniques for securing interfaces of merchant terminal 110 and customer terminal 112 may include preventing communications or monitoring communications received at each interface and rejecting any non-authenticated communications. In some embodiments, merchant terminal 110 and customer terminal 112 may include software or hardware for securing the various interfaces. For example, instructions stored in memory may allow merchant terminal 110 and customer terminal 112 to monitor communications received at an interface and determine whether a source of the communication is an approved source. If the source is not an approved source (e.g., a source indicated on a pre-defined "white list" or other approved source), then the communication may be rejected. In some embodiments, the interfaces of merchant terminal 110 and 112 may be secured using hardware, such as a switch, filter, or other device that prevents interaction with non-approved devices. In some embodiments, merchant terminal 110 and customer terminal 112 may take other actions to secure interfaces, such as restricting power to an interface, powering an interface down temporarily in response to determining that a received signal is not an authorized signal, or otherwise modifying the operation of the device or interfaces thereof to thwart an attack.

Figure 3:
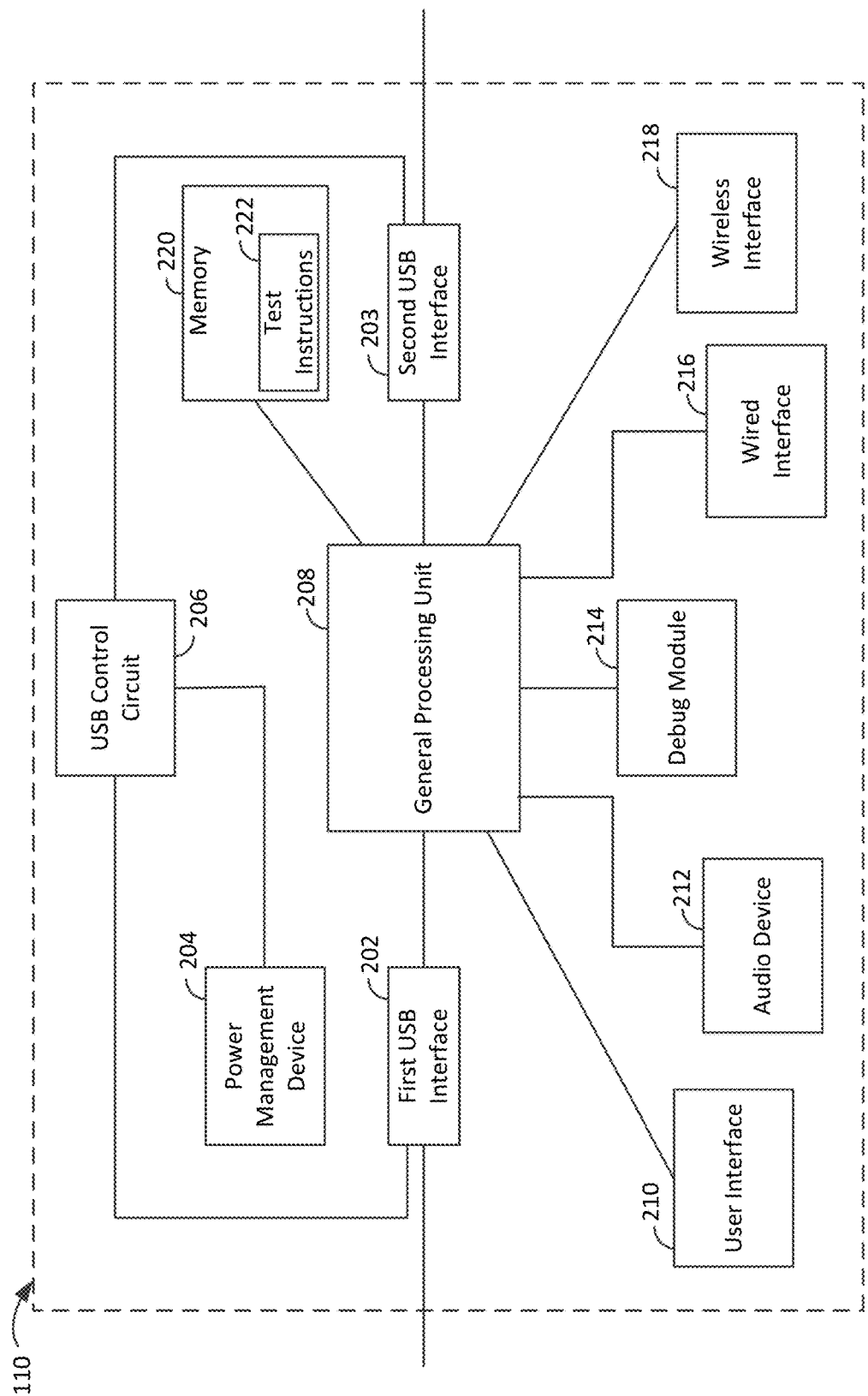
FIG. 3 depicts an illustrative block diagram of components of the merchant terminal in accordance with some embodiments of the present disclosure.

FIG. 3 depicts a block diagram of an example merchant terminal 110 in accordance with some embodiments of the present disclosure. Although particular components are depicted in a particular arrangement in FIG. 3, it will be understood that merchant terminal 110 may include additional components, one or more of the components depicted in FIG. 3 may not be included in merchant terminal 110, and the components of merchant terminal 110 may be rearranged in any suitable manner. Although it will be understood that merchant terminal 110 of point-of-sale system 100 may be implemented in any suitable manner, in one embodiment the merchant terminal 110 may comprise a first USB interface 202, a second USB interface 203, a power management device 204, a USB control circuit 206, a processing unit 208, a user interface 210, an audio device 212, a debug module 214, a wired interface 216, a wireless interface 218, and a memory 220.

Processing unit 208 of merchant terminal 110 may include a processor capable of performing the processing functions of the merchant terminal 110 as described herein, and may be embodied by any suitable hardware, software, memory, and circuitry as is necessary to perform those functions. Processing unit 208 may include any suitable number of processors, and may perform the operations of merchant terminal 110 based on instructions in any suitable number of memories and memory types. In an example embodiment, the processing unit 208 may be a System-on-Chip (SoC) processer having a dual-core processor (e.g., a Dual core ARM Cortex A7/A9).

Processing unit 208 may execute instructions stored in memory 220 of merchant terminal 110 (e.g., test instructions 222) to control the operations and processing of merchant terminal 110, and memory 220 may also store information necessary for the operation of merchant terminal 110. As used herein, memory may refer to any suitable tangible or non-transitory storage medium. Examples of tangible (or non-transitory) storage media include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device. In an example embodiment, memory 220 may include a flash memory and a RAM memory (e.g., a 16 GB eMMC NAND flash and a 2 GB LPDDR3 RAM).

First USB interface 202 and second USB interface 203 may provide for connection of other devices or components to the merchant terminal 110 as appropriate. Although any type of USB connector and interface may be used in accordance with the present disclosure, in an embodiment each of first USB interface 202 and second USB interface 203 may be a USB type B receptacle for interfacing with a type B connector of a USB connector (e.g., USB connector 106 or 108, for connecting to USB hub 104 or customer terminal 112). In an embodiment first USB interface 202 and second USB interface 203 may be interchangeable, such that merchant terminal 110 may function in an identical manner regardless of which of the USB interfaces is coupled to USB hub 104 or customer terminal 112. In some embodiments (not depicted in FIG. 3), the merchant terminal 110 may include additional interfaces, such as additional USB ports, Lightning, Firewire, Ethernet, etc. Note that first USB interface 202 and second USB interface 203 may be secured using various techniques, which may be implemented via hardware, software, or a combination thereof. As an example, general processing unit 208 may include instructions for restricting or rejecting all communications received at USB interface 202 or USB interface 203 that are not from an approved source (e.g., a source on a pre-defined "white list" stored in memory, such as memory 220, or a device lacking certain encryption keys). In some embodiments, USB interface 202 and USB interface 203 may be secured via hardware included in merchant terminal 110, such as a filter (e.g., high or low pass filter). Other techniques for securing USB interfaces 202 and 203 are possible in other embodiments.

Although power may be provided to merchant terminal 110 in any suitable manner, in an embodiment, DC power may be provided from USB hub 104 when it is connected to the merchant terminal via first USB interface 202 or second USB interface 203. A USB control circuit 206 may include circuitry for interacting with the USB hub 104 to receive the incoming DC power signal and to distribute that signal to other components of the merchant terminal 110 (e.g., via power management device 204) and to the customer terminal 112 (e.g., via the other USB interface of first USB interface 202 and second USB interface 203). A power management device 204 (e.g., a discrete power management integrated circuit) may receive power provided from USB hub 104 through one of the USB interfaces (first USB interface 202 or second USB interface 203) and USB control circuit 206, and may perform functions related to power requirements of a host system (e.g., DC to DC conversion, battery charging, linear regulation, power sequencing and other miscellaneous system power functions).

Merchant terminal 110 may also include a user interface 210. User interface 210 may provide various interfaces and outputs to the merchant terminal 110 to be viewed by a merchant. An example user interface 210 may include hardware and software for interacting with a user, such as a touchscreen interface, voice command interface, keyboard, mouse, gesture recognition, any other suitable user interface, or any combination thereof. In one embodiment, the user interface 210 may be a touchscreen interface that displays an interactive user interface for programs and applications such as a point-of-sale application running on the merchant terminal 110.

Note that user interface 210 may be secured using various techniques, which may be implemented hardware, software, or a combination thereof. For example, merchant terminal 110 may include instructions for rejecting any communication received at user interface 210 that is not from an authorized source (e.g., an authorized user). For example, in some embodiments, access may only be granted after a user demonstrates authorization by providing inputs (e.g., a combination or pattern or biometric information) at user interface 210 that match one or more predetermined inputs, such as a password. In some embodiments, user interface 210 may be configured to deny access if a user provides an input that does not match the predetermined input and reject any user input received until the predetermined input is received. Other techniques for securing user interface 210 may be possible in other embodiments.

Merchant terminal 110 may also include an audio device 212. Audio device 212 may provide audio for the merchant terminal 110. An example audio device 210 may comprise an audio amplifier and a speaker for providing appropriate audio for the merchant terminal 110. Operation of audio device 212 may be secured using various techniques, which may be implemented hardware, software, or a combination thereof. Merchant terminal 110 may restrict or reject communications received at the audio device 212 unless the communication is provided from a secure source, such as general processing unit 208. For example, audio device 212 may be disabled (e.g., by general processing unit 208) in response to receiving an unauthorized signal introduced at the audio device 212 from an external source. In some embodiments, audio device 212 may be secured physically, such as by use of a switch or other device. Other techniques for securing audio device 212 may be used in other embodiments.

Merchant terminal 110 may also include a debug module 214. In an embodiment, a debug module may provide an interface and processing for performing debug operations (e.g., by a technician utilizing a debug device), such as identifying and removing defects that prevent correct operation of the merchant terminal 110 and the various components thereof. In some embodiments, the functionality of debug module 214 may only be initiated in response to a predetermined self-test input, such that the debug interface is not externally accessible through a communication interface.

Merchant terminal 110 may also include a wired interface 216, which may include a suitable interface for wired communication, such as USB, Lightning, FireWire, Ethernet, any other suitable wired communication interface, or any combination thereof, to perform, for example, the wired communication with other devices of the payment system 100 and payment servers (e.g., via a secure internet connection). Wired interface 216 may be secured using various techniques, which may be implemented via hardware, software, or a combination thereof. In some embodiments, wired interface 216 may be secured by restricting or rejecting communications received at the wired interface 216 (e.g., by processing unit 208) unless the communication is determined to be from an approved source. In some embodiments, approved sources may include an approved transaction processing device or an authenticated transaction server, although various other approved sources may be possible in other embodiments. In some embodiments, wired interface 216 may be secured by limiting or restricting power supplied to wired interface 216, such as by power management device 204. In this regard, power may be selectively supplied to wired interface 216 as needed for securing wired interface 216, such as when an attempt to improperly access wired interface 216 is detected or wired interface 216 has received a malicious signal. Other techniques for securing wired interface 216 may be used in other embodiments.

Merchant terminal 110 may also include a wireless communication interface 218. The wireless communication interface 218 may include suitable hardware and software for providing a wireless communication interface such as Bluetooth classic, Bluetooth low energy, WiFi, cellular, short message service (SMS), NFC, any other suitable wireless communication interface, or any combination thereof. In an example embodiment, the wireless communication interface 218 may facilitate communications between the merchant terminal 110 and peripherals, as well as with payment servers (e.g., via a secure internet connection). Operation of wireless interface 218 may be secured using various techniques, which may be implemented via hardware, software, or a combination thereof. In some embodiments, wireless interface 218 may restrict or reject communications received from the wireless interface 218 unless the communication is from an approved source (e.g., a source on a pre-defined "white list" stored in memory, such as an approved wireless paired device or an authenticated transaction server, or having a required encryption key). In some embodiments, merchant terminal 110 may be "paired" with one or more approved wireless paired devices. Merchant terminal 110 also may communicate with at least one authenticated transaction server, such as from a verified financial institution. Wireless interface 218 may be secured so that wireless interface 218 only receives communications from an approved source (e.g., the authenticated transaction server or one of the one or more approved wireless paired devices), and rejects communications from other sources. In some embodiments, wireless interface 218 may be secured by limiting or restricting power supplied to wireless interface, such as by power management device 204. In some embodiments, interfaces of the merchant terminal 110 may be secured using filters, switches, or other physical means. Other techniques for securing wireless interface 218 may be used in other embodiments.

Test instructions 222 may be stored in memory 220 and may include instructions for determining when to initiate a secured test mode. In some embodiments, secured test mode may be initiated in response to an occurrence of an event (e.g., when merchant terminal 110 boots), in response to receiving an input (e.g., when a user enters a self-test input input) or otherwise. In some embodiments, test instructions 222 may include instructions for entering the secured test mode automatically when merchant terminal 110 powers up, but merchant terminal 110 may enter a secured test mode at other times in other embodiments.

Test instructions 222 may include instructions for recognizing a predetermined self-test input (e.g., a predetermined pattern of touch inputs) received at user interface 210. As noted above, interfaces of merchant terminal 110 may be secured to prevent unauthorized communication, including user inputs provided at user interface 210. In some embodiments, test instructions 222 may include instructions for receiving an input at the user interface 210 and comparing it with a pre-determined input. If the received input matches the self-test input, the merchant terminal 110 may take action based on test instructions 222 (e.g., enter a secured test mode or perform system tests if the merchant terminal 110 is already in secured test mode). In some embodiments, the self-test input may comprise a touch input, such as a tap, press, swipe, or other touch input provided at user interface 210. The self-test input may comprise a pattern of touch inputs, such as one or more touch inputs at one or more locations of user interface 210. Note that a self-test input may comprise a combination of touch inputs, and may comprise a variety of patterns of touch inputs or combinations of touch inputs. In some embodiments, the self-test input may be other inputs capable of being received or detected at user interface 210, such as motion, sound, or other inputs.

In some embodiments, test instructions 222 may include instructions for performing system tests and diagnostics, such as while the merchant terminal 110 is in the secured test mode. In some embodiments, system tests included in test mode instructions 222 may include a device test, an encryption key test, file system test, certificate test, tamper system tests, hardware tests, and payment interface tests, but other tests are possible in other embodiments. In some embodiments, test instructions 222 may include instructions for performing a test of any of the resources of merchant terminal 110, such as to confirm information about merchant terminal 110. For instance, test instructions 222 may include instructions for verifying versions of software (e.g., firmware) installed on the merchant terminal 110, verifying security information of merchant terminal 110, or other information.

Test instructions 222 may include instructions for performing an encryption key test. In some embodiments, the encryption key test may collect information about encryption keys stored at merchant terminal 110 (e.g., in memory 220). In some embodiments, test instructions 222 may include instructions for comparing the encryption keys stored at merchant terminal 110 with desired encryption keys to determine whether merchant terminal 110 has proper encryption keys. In some embodiments, test instructions 222 may include instructions for providing information indicative of a result of the encryption key test, such as via a machine-readable output for display at the user interface 210. In other embodiment, test instructions 222 may include instructions for testing encryption algorithms, testing encrypted connections with other devices, and providing test results as part of the encryption key test.

Test instructions 222 may include instructions for performing a file system test. In some embodiments, the file system test may collect information about the file system stored at merchant terminal 110 (e.g., in memory 220). In some embodiments, test instructions 222 may include instructions for verifying instructions for storing files at merchant terminal 110, such as by determining whether files, instructions, and data stored at merchant terminal 110 are corrupt. In some embodiments, test instructions 222 may include instructions for providing information indicative of a result of the file system test, such as via a machine-readable output for display at the user interface 210. In other embodiments, test instructions 222 may include instructions for examining additional functionality of the file storage system of merchant terminal 110, executing other testing steps, and providing test results as part of the file system test.

Test instructions 222 may include instructions for performing a security certificate test. In some embodiments, the security certificate test may collect information about security certificates stored at merchant terminal 110 (e.g., in memory 220). In some embodiments, test instructions 222 may include instructions for comparing the security certificates stored at merchant terminal 110 with required security certificates to determine whether merchant terminal 110 has proper security certificates. In some embodiments, test instructions 222 may include instructions for providing information indicative of a result of the security certificate test, such as via a machine-readable output for display at the user interface 210. In other embodiment, test instructions 222 may include instructions for examining other security information, executing additional testing steps (e.g., communicating with other devices to confirm security certificates), and providing test results as part of the security certificate test.

Test instructions 222 may include instructions for performing a tamper system test. In some embodiments, the tamper system test may collect information about operation of the tamper devices installed at merchant terminal 110 (e.g., in memory 220). In some embodiments, test instructions 222 may include instructions for verifying operation of each tamper device installed at merchant terminal 110 (e.g., tamper meshes, tamper domes, tamper switches, tamper sensors, etc.), such as by communicating with a tamper device to provide a test signal and response. In some embodiments, test instructions 222 may include instructions for providing information indicative of a result of the tamper system test, such as via a machine-readable output for display at the user interface 210. In other embodiments, test instructions 222 may include instructions for examining any functionality of the tamper devices of merchant terminal 110, executing any other testing steps, and providing test results as part of the tamper system test.

Test instructions 222 may have instructions for generating a machine-readable output indicative of system test results and providing it to user interface 210. The machine-readable output may comprise a barcode, quick response (QR) code, or other machine-readable output. In some embodiments, the machine-readable output may be displayed by user interface 210 (e.g., at a touchscreen of user interface 210) for optical verification of results of the various system tests, although the machine readable output may be provided in other manners (e.g., a communication signal, audio output, etc.). As noted above, test instructions 222 may include instructions for generating a machine-readable output that comprises test results (e.g., whether merchant terminal 110 passed or failed a system test) for each of the device test, encryption key test, file system test, certificate test, and tamper system test. In some embodiments, a machine-readable output may be generated and displayed at user interface 210 for results of other tests.

Test instructions 222 may have instructions for generating a human-readable output indicative of a system test result and providing it to user interface 210. The human-readable output may comprise a display of messages, communication of message to an external device, audio result, or other suitable notification that can be understood by a human operator (e.g., via user interface 210). Test instructions 222 may include instructions for generating a human-readable output that comprises test results (e.g., whether merchant terminal 110 passed or failed a system test) for each of the device test, encryption key test, file system test, certificate test, and tamper system test. In some embodiments, a human-readable output may be generated and displayed at user interface 210 for results of other tests.

Test instructions 222 may include instructions for removing the output (e.g., machine-readable output and/or human-readable output) and exiting a secured test mode. In some embodiments, test instructions 222 may include instructions for displaying the output indicative of system test results until an event occurs, such as expiration of a pre-determined period of time, receipt of a self-test input (e.g., at user interface 210), or other event. When the event occurs, merchant terminal 110 may stop displaying the output and transition out of secured test mode. In some embodiments, test instructions 222 may include instructions for entering merchant terminal 110 into secured test mode (e.g., in response to an event or input), performing system tests, and waiting until an event occurs (e.g., a self-test input is received). In some embodiments, test instructions 222 may include instructions for transitioning merchant terminal 110 from secured test mode if the event does not occur (e.g., no self-test input is received) within a pre-determined amount of time. In other embodiments, test instructions 222 may include instructions for removing the output from display at the user interface 210 in response to exiting the secured test mode at the merchant terminal 110. Test instructions 222 may include instructions for exiting secured test mode in response to other events in other embodiments.

Figure 4:
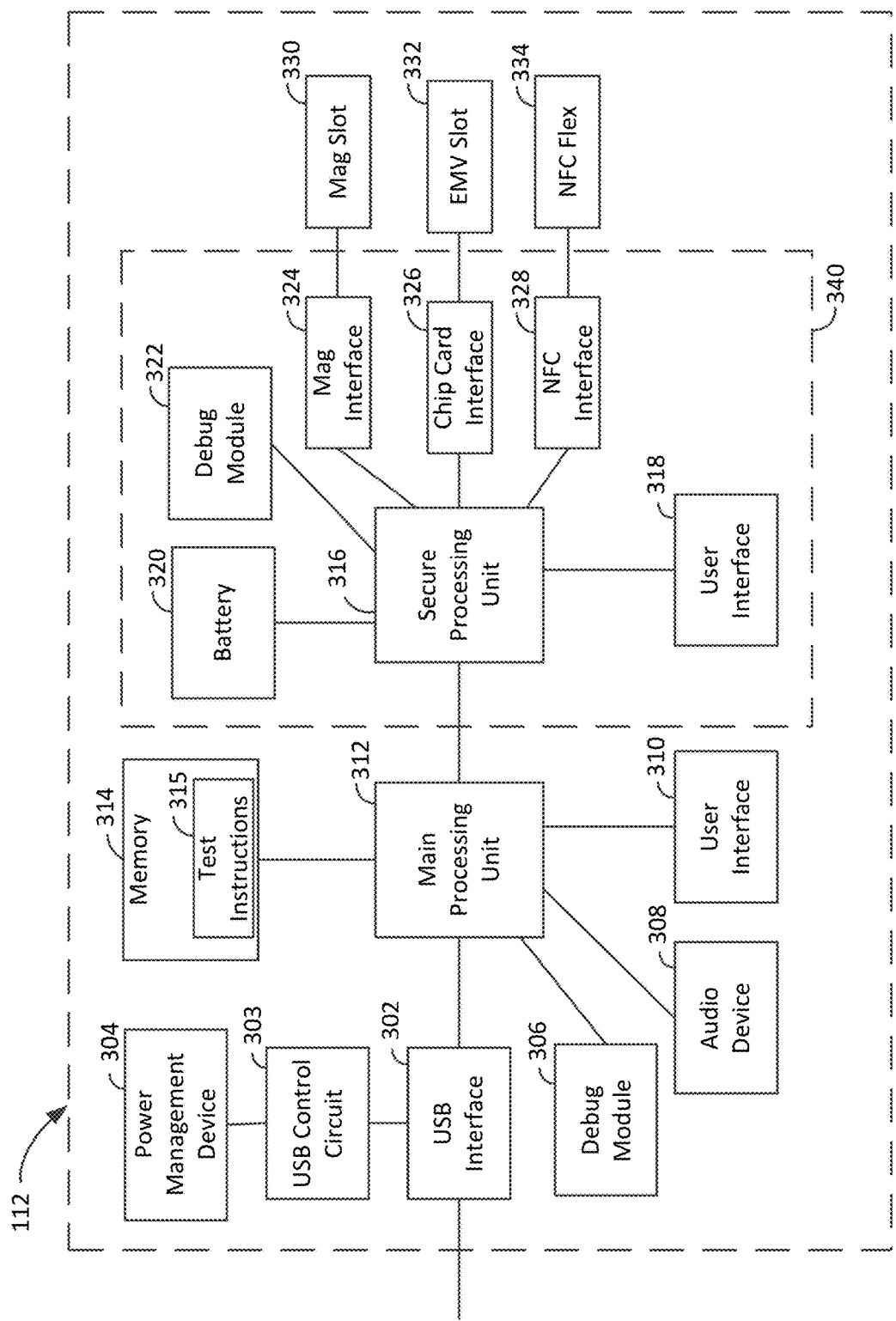
FIG. 4 depicts an illustrative block diagram of components of the customer terminal in accordance with some embodiments of the present disclosure.

FIG. 4 depicts a block diagram of an example customer terminal 112 in accordance with some embodiments of the present disclosure. Although particular components are depicted in a particular arrangement in FIG. 4, it will be understood that customer terminal 112 may include additional components, one or more of the components depicted in FIG. 4 may not be included in customer terminal 112, and the components of customer terminal 112 may be rearranged in any suitable manner. In one embodiment, customer terminal 110 may comprise a USB interface 302, a power management device 304, a debug module 306, an audio device 308, a user interface 310, a main processing unit 312, a memory 314, a secure enclave 340, a magnetic swipe slot 330, an EMV slot 332, and an NFC flex circuit 334.

Main processing unit 312 of customer terminal 112 may include a processor capable of performing the processing functions of the customer terminal 112 as described herein, and may be embodied by any suitable hardware, software, memory, and circuitry as is necessary to perform those functions. Main processing unit 312 may include any suitable number of processors, and may perform the operations of customer terminal 112 based on instructions in any suitable number of memories and memory types. In an example embodiment, the main processing unit 312 may be a System-on-Chip (SoC) processer having a dual-core processor (e.g., a Dual core ARM Cortex A7/A9).

Main processing unit 312 may execute instructions stored in memory 314 of customer terminal 112 to control the operations and processing of customer terminal 112, and the memory 314 may also store information necessary for the operation of customer terminal 112. In an example embodiment, memory 314 may include a flash memory and a RAM memory (e.g., a 16 GB eMMC NAND flash and a 2 GB LPDDR3 RAM).

USB interface 302 may provide for a connection to the merchant terminal 110 in order to receive power from merchant terminal 110 and to communicate with the merchant terminal 110. Although any type of USB connector and interface may be used in accordance with the present disclosure, in an embodiment USB interface 302 may be a USB type B receptacle for interfacing with a micro USB type B connector of a USB connector (e.g., USB connector 106 or 108, for connecting to merchant terminal 110). In some embodiments (not depicted in FIG. 3), customer terminal 112 may include additional wired or wireless interfaces such as additional USB ports, Lightning, Firewire, Ethernet, WiFi, Bluetooth, etc. Operation of USB interface 302 and other communication interfaces may be secured using various techniques. Customer terminal 112 may restrict or reject communications received from the communication interfaces (e.g., USB interface 302) unless the communication is from an approved merchant terminal 110 or an authenticated transaction server (e.g., based on encryption key information, approved "white list" devices, etc.). For example, instructions stored in memory, such as memory 314, may include instructions for determining whether a communication received at USB interface 302 is from an approved device and rejecting communications otherwise. In some embodiments, the communication interface (e.g., USB interface 302) may be secured physically, such as by use of a switch or other device. Other techniques for securing USB interface 302 may be used in other embodiments.

Although power may be provided to customer terminal 112 in any suitable manner, in an embodiment DC power may be provided from merchant terminal 110 when it is connected to the customer terminal 112 via the USB interface 302. A USB control circuit 303 may include circuitry for interacting with the merchant terminal 110 to receive the incoming DC power signal and to distribute that signal to other components of the customer terminal 112 (e.g., via power management device 304). In some embodiments, USB control circuit 303 may enable additional functionality, such as initiating a reprogramming mode for the customer terminal based on a received voltage at USB interface 302 (e.g., at an ID pin of USB interface 302). A power management device 304 (e.g., a discrete power management integrated circuit) may receive power provided from merchant terminal 110 through the USB interface 302 and USB control circuit 303, and may perform functions related to power requirements of the customer system (e.g., DC to DC conversion, battery charging, linear regulation, power sequencing and other miscellaneous system power functions).

Customer terminal 112 may also include a user interface 310. User interface 310 may provide various interfaces and outputs to the customer terminal 112 to be viewed by a customer. An example user interface 310 may include hardware and software for interacting with a customer, such as a touchscreen interface, voice command interface, keyboard, mouse, gesture recognition, any other suitable user interface, or any combination thereof. In one embodiment, the user interface 310 may be a touchscreen device that displays an interactive user interface for the customer to engage in purchase transactions (e.g., select items for purchase, answer queries, confirm purchases, provide PINS and signatures, etc.) at the customer terminal 112.

Customer terminal 112 may also include an audio device 308. Audio device 308 may provide audio for the customer terminal 112. An example audio device 308 may comprise an audio amplifier and a speaker for providing appropriate audio for the customer terminal 112. Operation of audio device 308 may be secured using various techniques. Customer terminal 112 may restrict or reject communications (e.g., a signal) received at the audio device 308 unless the communication is provided from a processor of customer terminal 112, such as main processing unit 312. For example, instructions stored in memory, such as memory 314, may include instructions for disabling audio device 308 or rejecting communications. In some embodiments, audio device 308 may be secured physically, such as by use of a switch or other device. Other techniques for securing audio device 308 may be used in other embodiments.

Customer terminal 112 may also include a debug module 306. In an embodiment, a debug module 306 may provide an interface and processing for performing debug operations (e.g., by a technician utilizing a debug device), such as identifying and removing defects that prevent correct operation of the customer terminal 112 and the various components thereof. In an embodiment, debug module 306 may be secured using various techniques. Debug module 306 may restrict or reject communications (e.g., a signal) received from the debug module 306 unless the communication is from an approved device. For example, instructions stored in memory, such as memory 314, may include instructions for determining whether a communication received at debug module 306 is from an approved device and rejecting communications otherwise. In some embodiments, the functionality of debug module 306 may only be initiated in response to a predetermined self-test input, such that the debug interface is not externally accessible through a communication interface. In some embodiments, debug module 306 may be secured physically, such as by use of a filter, switch or other device. Other techniques for securing debug module 306 may be used in other embodiments.

The secure enclave 340 may be a secure portion of the customer terminal 112 that performs critical functionality such as interacting with payment devices and cryptography, and that stores sensitive information such as cryptographic keys, passwords, and user information. In an embodiment, the secure enclave 340 may be located in a distinct location of the customer terminal 112 to isolate the secure enclave 340 from other circuitry of the customer terminal 112 and to allow protective measures (e.g., tamper detection switches, anti-tamper meshes, anti-tamper domes, isolated compartments, etc.) to be installed near and around the secure enclave 340 (not depicted in FIG. 4). In an example embodiment, the secure enclave 340 may be situated at a portion of the customer terminal 112 in a manner that provides additional physical clearance for protective measures.

In an embodiment, the secure enclave 340 may include a secure processing unit 316, a user interface 318, a battery 320, a debug module 322, a magnetic swipe interface 324, a chip card interface 326, and an NFC interface 328.

Although secure processing unit 316 may be implemented with any suitable processor, hardware, software, or combination thereof, in an embodiment, secure processing unit 316 may be implemented as microcontroller such as the K21 microcontroller unit (MCU) supplied by Freescale Semiconductor, Inc. Secure processing unit 316 may perform transaction processing and cryptographic operations, based on instructions and information (e.g., customer data, encryption keys, etc.) stored in a memory of secure processing unit 316 (not separately depicted in FIG. 4), which may be any suitable memory as described herein. Secure processing unit 316 may communicate with main processing unit 312 in order to receive and respond to requests for processing of payment information. Communications may be performed using any suitable internal bus and communication technique (e.g., UART, SPI, I$^2$C, and GPIO).

The secure enclave 340 of customer terminal 112 may also include a battery 320. In some embodiments, the battery 320 may function as a primary power source to certain components of the secure enclave 340 (e.g., memory storing critical payment, customer, and encryption information), such that when the battery power is removed the information is lost. The battery 320 may function in this manner in response to a tamper attempt, such that in response to the tamper attempt, the secured information is destroyed.

The secure enclave 340 of customer terminal 112 may also include a debug module 322. In an embodiment, a debug module 322 may provide an interface and processing for performing debug operations (e.g., by a technician utilizing a debug device) directly with the components of the secure enclave. In some embodiments, the functionality of debug module 322 may only be initiated in response to a predetermined self-test input, such that the debug interface is not externally accessible through a communication interface.

The secure enclave 340 of customer terminal 112 may also include a user interface 318. In an embodiment, user interface 318 (e.g., a keypad, touchscreen, etc.) may be located within the secure enclave such that certain content is provided to the secure enclave 340 rather than the general processing circuitry of the customer terminal 112. In this manner, critical information such as PIN numbers, signatures, and passwords may be provided only to the secure enclave 340 in the first instance, and then forwarded to the main processing unit 312 in encrypted or unencrypted form, as required.

Secure enclave 340 of customer terminal 112 may also include a magnetic swipe interface 324, chip card interface 326, and NFC interface 328. Each of these components may include interface circuitry for receiving and processing signals from a payment interface, such as a magnetic reader head 330, a chip card slot 332 (e.g., providing power and communications to the chip card), and an NFC circuit, components of which may be located on an NFC flex circuit 334 remote from secure enclave 340. Note that the interfaces of secure enclave 340 (e.g., magnetic swipe interface 324, chip card interface 326, and NFC interface 328) may be secured using various techniques. Customer terminal 112 may restrict or reject communications (e.g., signals) received at magnetic swipe interface 324, chip card interface 326, and NFC interface 328 unless from an approved device or source. For example, instructions stored in memory, such as memory 314, may include instructions for disabling secure enclave 340 and limiting or rejecting communications at magnetic swipe interface 324, chip card interface 326, and NFC interface 328. In some embodiments, secure enclave 340 may be secured physically, such as by use of a switch or other device. Other techniques for interfaces of secure enclave 340 may be used in other embodiments.

Test instructions 315 may have instructions for determining when to initiate secured test mode. In some embodiments, secured test mode may be initiated in response to an occurrence of an event (e.g., when customer terminal 112 boots), in response to receiving an input (e.g., when a user enters a self-test input input) or otherwise. In some embodiments, test instructions 315 may include instructions for entering the secured test mode automatically when customer terminal 112 powers up, but customer terminal 112 may enter a secured test mode at other times in other embodiments.

Test instructions 315 may have instructions for recognizing a predetermined self-test input (e.g., a predetermined pattern of touch inputs) received at user interface. As noted above, interfaces of customer terminal 112 may be secured to prevent unauthorized communication, including user inputs provided at user interface 310. In some embodiments, test instructions 315 may include instructions for receiving an input at the user interface 310 and comparing it with a pre-determined input. If the received input matches the self-test input, the customer terminal 112 may take action based on test instructions 315 (e.g., enter a secured test mode or perform system tests if the customer terminal 112 is already in secured test mode). In some embodiments, the self-test input may comprise a touch input, such as a tap, press, swipe, or other touch input provided at user interface 310. The self-test input may comprise a pattern of touch inputs, such as one or more touch inputs at one or more locations of user interface 310. Note that a self-test input may comprise a combination of touch inputs, and may comprise a variety of patterns of touch input or combination of touch inputs. In some embodiments, the self-test input may be other inputs capable of being received or detected at user interface 310, such as motion, sound, or other inputs.

Test instructions 315 stored in memory 314 may include instructions for performing system tests an diagnostics, such as while customer terminal 112 is in the secured test mode. In some embodiments, device tests included in test instructions 315 may include tamper system test hardware tests and payment interface tests, but other tests are possible in other embodiments. In some embodiments, test instructions 315 may include instructions for performing a test of any of the resources of customer terminal 112, such as to confirm information about customer terminal 112. For instance, test instructions 315 may include instructions for verifying versions of software (e.g., firmware) installed on the customer terminal 112, verifying security information of customer terminal 112, or other information.

Test instructions 315 may include instructions for performing an encryption key test. In some embodiments, the encryption key test may collect information about encryption keys stored at customer terminal 112 (e.g., in memory 314). In some embodiments, test instructions 222 may include instructions for comparing the encryption keys stored at customer terminal 112 with desired encryption keys to determine whether customer terminal 112 has proper encryption keys. In some embodiments, test instructions 315 may include instructions for providing information indicative of a result of the encryption key test, such as via a machine-readable output for display at the user interface 310. In other embodiment, test instructions 315 may include instructions for testing encryption algorithms, testing encrypted connections with other devices, and providing test results as part of the encryption key test.

Test instructions 315 may include instructions for performing a file system test. In some embodiments, the file system test may collect information about the file system stored at customer terminal 112 (e.g., in memory 314). In some embodiments, test instructions 314 may include instructions for verifying instructions for storing files at customer terminal 112, such as by determining whether files, instructions, and data stored at customer terminal 112 are corrupt. In some embodiments, test instructions 315 may include instructions for providing information indicative of a result of the file system test, such as via a machine-readable output for display at the user interface 310. In other embodiments, test instructions 315 may include instructions for examining additional functionality of the file storage system of customer terminal 112, executing other testing steps, and providing test results as part of the file system test.

Test instructions 315 may include instructions for performing a security certificate test. In some embodiments, the security certificate test may collect information about security certificates stored at customer terminal 112 (e.g., in memory 314). In some embodiments, test instructions 315 may include instructions for comparing the security certificates stored at customer terminal 112 with required security certificates to determine whether customer terminal 112 has proper security certificates. In some embodiments, test instructions 315 may include instructions for providing information indicative of a result of the security certificate test, such as via a machine-readable output for display at the user interface 310. In other embodiment, test instructions 315 may include instructions for examining other security information, executing additional testing steps (e.g., communicating with other devices to confirm security certificates), and providing test results as part of the security certificate test.

Test instructions 315 may include instructions for performing a tamper system test. In some embodiments, the tamper system test may collect information about operation of the tamper devices installed at customer terminal 112 (e.g., in memory 314). In some embodiments, test instructions 315 may include instructions for verifying operation of each tamper device installed at customer terminal 112 (e.g., tamper meshes, tamper domes, tamper switched, tamper sensors, etc.), such as by communicating with a tamper device to provide a test signal and response. In some embodiments, test instructions 315 may include instructions for providing information indicative of a result of the tamper system test, such as via a machine-readable output for display at the user interface 310. In other embodiments, test instructions 315 may include instructions for examining any functionality of the tamper devices of customer terminal 112, executing any other testing steps, and providing test results as part of the tamper system test.

Test instructions 315 may have instructions for generating a machine-readable output indicative of a system test result and providing it to user interface 310. The machine-readable output may comprise a barcode, quick response (QR) code, or other machine-readable output. In some embodiments, the machine-readable output may be displayed by user interface 310 (e.g., at a touchscreen of user interface 310) for optical verification of results of the various system tests, although the machine readable output may be provided in other manners (e.g., a communication signal, audio output, etc.). As noted above, test instructions 315 may include instructions for generating a machine-readable output that comprises test results (e.g., whether customer terminal 112 passed or failed a system test) for each of the device test, encryption key test, file system test, certificate test, and tamper system test. In some embodiments, a machine-readable output may be generated and displayed at user interface 310 for results of other tests.

Test instructions 315 may have instructions for generating a human-readable output indicative of a system test result and providing it to user interface 318. The human-readable output may comprise a display of messages, communication of message to an external device, audio result, or other suitable notification that can be understood by a human operator (e.g., via user interface 318). Test instructions 315 may include instructions for generating a human-readable output that comprises test results (e.g., whether CUSTOMER terminal 112 passed or failed a system test) for each of the system test, encryption key test, file system test, certificate test, and tamper system test. In some embodiments, a human-readable output may be generated and displayed at user interface 318 for results of other tests.

Test instructions 315 may include instructions for removing the output (e.g., machine-readable output and/or human-readable output) and exiting a secured test mode. In some embodiments, test instructions 315 may include instructions for displaying the output indicative of system test results until an event occurs, such as expiration of a pre-determined period of time, receipt of a self-test input (e.g., at user interface 310), or other event. When the event occurs, customer terminal 112 may stop displaying the output and transition out of secured test mode. In some embodiments, test instructions 315 may include instructions for entering customer terminal 112 into secured test mode (e.g., in response to an event or input), performing system tests, and waiting until an event occurs (e.g., a self-test input is received). In some embodiments, test instructions 315 may include instructions for transitioning customer terminal 112 from secured test mode if the event does not occur (e.g., no self-test input is received) within a pre-determined amount of time. In other embodiments, test instructions 315 may include instructions for removing the output from display at the user interface 310 in response to exiting the secured test mode at the customer terminal 112. Test instructions 315 may include instructions for exiting secured test mode in response to other events in other embodiments.

Figure 5:
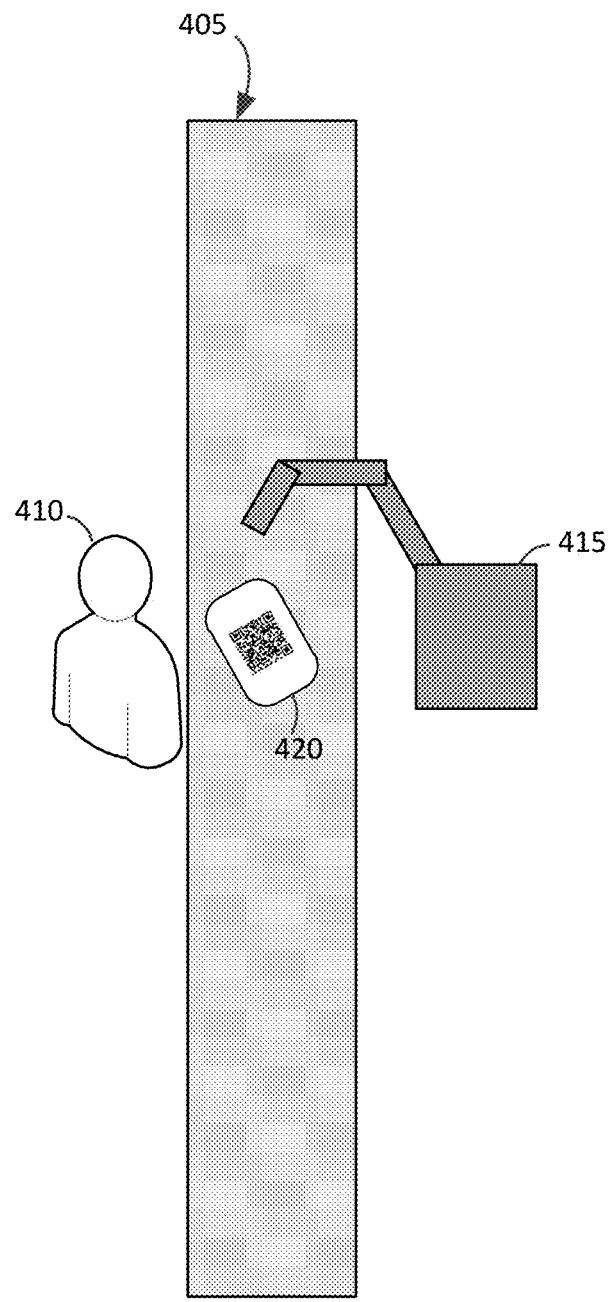
FIG. 5 depicts an exemplary test station as viewed from above, including a user, a device, and a data processing system in accordance with some embodiments of the present disclosure.

FIG. 5 is an example test station 405 with user 410 and test equipment 415 for testing an exemplary device 420. The test station 405 in the embodiment of FIG. 5 is a conveyor belt that delivers devices (e.g., device 420) to a testing area for testing, but in other embodiments, test station 405 may be another process, workflow or combination thereof. In some embodiments, the test station 405 may receive devices 420 (e.g., merchant terminals 110 and/or customer terminals 112) as part of a final test, evaluation or verification procedure performed by user 410. For example, the device 420 may be provided to the test station 405 following fabrication of the device 420 but before packaging and shipping. In some embodiments, test station 405 may be a remote environment where testing of a device 420 is required (e.g., in a merchant's store or other location of a device 420). The test station 405 may receive various devices 420, but in some embodiments, the device 420 may be a payment terminal (e.g., merchant terminal 110 and customer terminal 112) or other transaction processing device.

User 410 may be a manufacturing line technician, robot, or other entity verifying device information or performing system tests (e.g., the tests performed by testing instructions 222 and 315 described above). User 410 may initiate secured test mode at the device or instruct the device to display machine-readable system test results, such as by entering a self-test input. In some embodiments, when a device 420 arrives on test station 405, user 410 may prepare the device to display device information for scan by test equipment 415. User 410 may initiate secured test mode at the device 420 by providing a self-test input at a user interface of the device 420, such as by tapping a touchscreen, swiping the screen, providing approved biometric information, entering a predefined touch pattern or otherwise. In some embodiments, user 410 may initiate secured test mode by providing other inputs, such as voice commands or an approved machine readable code.

In some embodiments, when a self-test input is received at the device 420, the device 420 may respond by entering a secured test mode and performing system tests as described herein. For example, the device 420 may perform a device test, an encryption key test, a file system test, a certificate test, and a tamper system test upon receiving a self-test input. In some embodiments, device 420 may perform the key system tests at other times, such as when the device boots, and wait to provide test results until the self-test input has been received or at another time. Device 420 may display system test results, such as in a machine-readable and/or human-readable output, in response to receiving the self-test input.

In some embodiments, user 410 uses test equipment 415 to read information displayed by device 420, such as the machine-readable output. Test equipment 415 can be various devices capable of reading machine-readable output, and may include a camera, infrared (IR) scanner, or other device for receiving the machine-readable output. In some embodiments, test equipment 415 may comprise a stationary test stand at a test station 405, but in some embodiments, test equipment 415 may be various devices, such as a mobile handheld unit or other equipment capable of reading output in machine-readable format displayed by device 420. In some embodiments, test equipment 415 may be configured to read various formats of machine-readable output, such as a bar code, QR code, or other machine-readable output format.

In some embodiments, test equipment 415 can store, transmit, or interpret data received by reading the machine-readable output displayed by device 420, such as by a processor and in memory at test equipment 415 (not specifically shown in FIG. 5). Data received by test equipment 415 may be stored in various memory types, and, in some embodiments, may be stored locally at test equipment 415 or stored via a local database or a cloud-based storage system. In some embodiments, data read from output of device 420 can be stored on removable or permanent memory media. In some embodiments, test equipment 415 can process data read from a device 420 for transmission over a network, such as to a remote server. In some embodiments, test equipment 415 may store information from a device 420 in a database or may communicate data for storage at a database. In some embodiments, the database may be remote and may receive data from a plurality of test equipment 415 about devices 420. Data read at test equipment 415 also can be shared by various techniques in other embodiments, including via wireless communication protocol or otherwise.

Test equipment 415 may use data from the machine-readable output to make determinations about a device 420. As an example, test equipment 415 may be configured to determine information about device 420, such as results of system tests performed while device 420 is in the secured test mode (e.g., pass or fail), versions of hardware, firmware or software installed on device 420 or other information about the device. In some embodiments, test equipment 415 can generate a report including information about system test results for device 420. In some embodiments, test equipment 415 may identify a unique device identifier of device 420 based on the data and can report that the particular device failed or passed one or more system tests.

Test equipment 415 may be configured to analyze information from device 420, such as to identify failed tests, system errors or inconsistencies, or other anomalies. In some embodiments, test equipment 415 may be configured to propose or take action based on the analysis. For example, test equipment 415 may be configured to evaluate data read from a device 420 and determine whether the device 420 has passed a requisite number of system tests or other device information. If the device 420 has not passed the number of tests, or if service of the device 420 is required for proper operation, test equipment 415 may propose action, such as by communicating with user 410, a remote server, or otherwise. In some embodiments, a processor of test equipment 415 (not specifically shown in FIG. 5) can execute instructions to determine a course of action for rectifying problems (e.g., as indicated by failed system tests) at device 420, such as by inputting data from the machine-readable output into an algorithm. In some embodiments, test equipment 415 may input information from device 420 and information from the same or other devices 420 stored in a database into the machine-learning algorithm (e.g., regression, random forest, decision tree, or other machine-learning algorithm). Test equipment 415 may use information from device 420 and compare it with other information (e.g., from other devices) to make determinations, such as for identifying wide-spread device issues, software or hardware troubleshooting, manufacturing and serving quality control, or for other purposes.

Figure 6A:
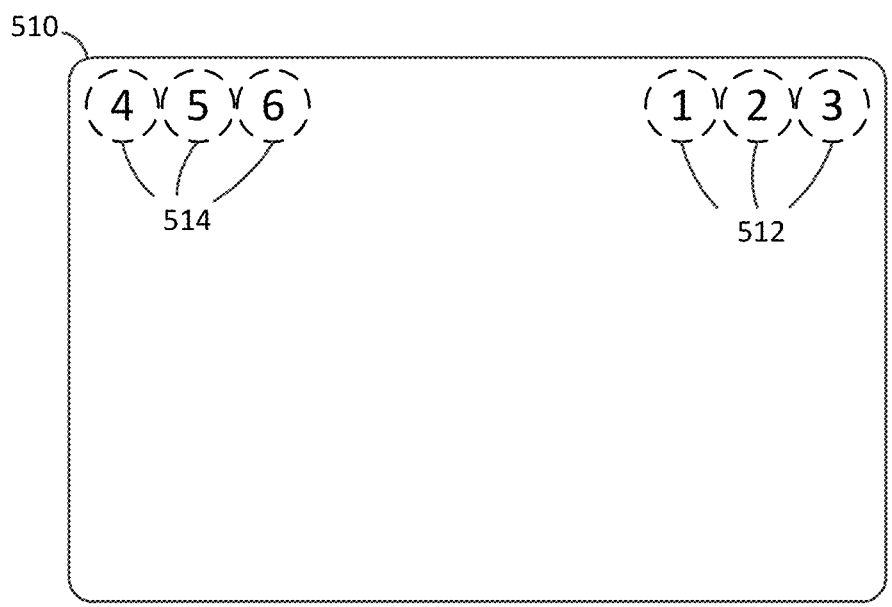
FIG. 6A depicts a front perspective view of a screen of a merchant terminal showing locations of self-test inputs, such as structured touch inputs, on the screen in accordance with some embodiments of the present disclosure.
Figure 6B:
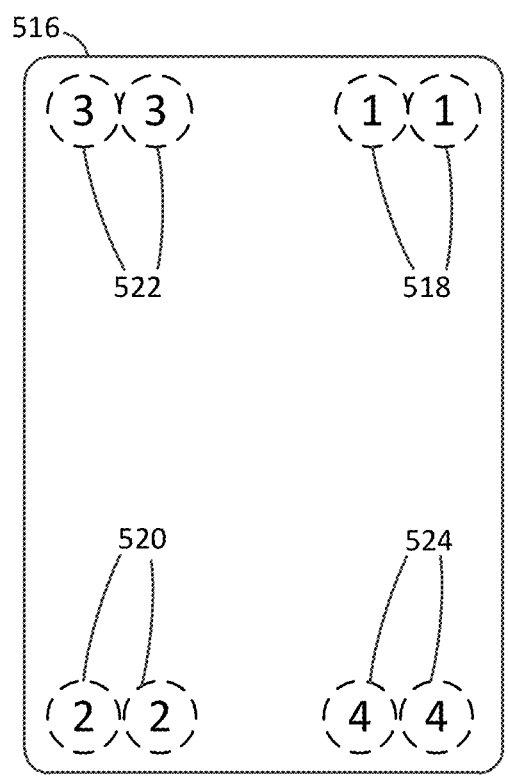
FIG. 6B depicts a front perspective view of a screen of a customer terminal showing only locations of self-test inputs, such as structured touch inputs, on the screen in accordance with some embodiments of the present disclosure.

FIGS. 6A and 6B depict front perspective views of screens of a merchant terminal (FIG. 6A) and customer terminal (FIG. 6B) showing locations of self-test inputs, such as touch inputs, on the screens in accordance with some embodiments of the present disclosure. FIG. 6A depicts a merchant terminal 510 with touch locations 512 and 514, while FIG. 6B depicts a customer terminal 516 with locations 518, 520, 522 and 524. The merchant terminal 510 and customer terminal 516 of FIGS. 6A and 6B can be various payment terminal devices, but in an embodiment, the merchant terminal 510 is the same merchant terminal 110 as is depicted at FIG. 3 and described above, and customer terminal 56 is the same customer terminal 112 as is depicted at FIG. 4 and described above. Note that each of the payment terminal devices shown by FIGS. 6A and 6B has one touch screen, but a self-test input can be provided via any number of touchscreens or other user interfaces in other embodiments. In addition, in some embodiments, self-tests can be executed on more than one device (e.g., merchant terminal 510 and customer terminal 516) in response to receipt of a self-test input.

The merchant terminal 510 depicted by FIG. 6A and customer terminal of FIG. 6B each have a touchscreen with self-test input locations and sequence. When a user provides touch inputs at locations and in the sequence identified in FIGS. 6A and 6B, each of merchant terminal 510 and customer terminal 516 may recognize a self-test input. The locations of FIGS. 6A and 6B correspond to locations of touch inputs, while numerals within each location correspond a touch input sequence. For example, each location 512, 514, 518, 520, 522 and 524 may correspond to a location at which a user must provide a touch input (e.g., a finger press or tap on the touchscreen). A user must first provide a touch input at each location marked 1 (e.g., location 512 and 518), then provide a touch input at each location with the next highest numerical value. A user may continue to provide touch inputs at locations corresponding to each numeral, in ascending order, until a touch input has been provided at all of the locations 512, 514, 518, 520, 522 and 524 of FIGS. 6A and 6B. In some embodiments, a user must provide two or more touch inputs simultaneously, such as is depicted in FIG. 6B (e.g., by simultaneously touching each location marked with the same numeral, in ascending numerical order). Other self-test input patterns, sequences, or inputs may be provided in other embodiments. Note that FIGS. 6A and 6B only depict boundaries of a touchscreen of merchant terminal 510 and customer terminal 516, but merchant terminal 510 and customer terminal 516 may have other components (e.g., housings, stands, or other components) not depicted by FIGS. 6A and 6B, and it will be understood that the exemplary touchscreens may be coupled to various other hardware components.

In some embodiments, instructions stored at merchant terminal 510 and customer terminal 516 may be configured to recognize a pattern of touch inputs (such as the exemplary patterns shown at FIGS. 6A and 6B) as a self-test input. Each of merchant terminal 510 and customer terminal 516 may be configured to receive touches, and compare the touches (e.g., locations 512 and 514 in sequence for merchant terminal 510 and locations 518, 520, 522 and 524 in sequence for customer terminal 516) with a touch pattern template stored in memory at one or more of merchant terminal 510 or customer terminal 516 respectively. If the touches match the touches indicated by the template, the requested test mode may be executed. Note that the template may include both location and sequence information for touch inputs.

In some embodiments, merchant terminal 510 and customer terminal 516 may be configured to conduct tests in secured test mode or display machine-readable output if self-tests have already been done, such as in embodiments when tests are performed at device boot. As noted above, merchant terminal 510 and customer terminal 516 may transition merchant terminal 510 into secured test mode or cause merchant terminal 510 to display system test results in machine-readable format upon receiving the self-test input. Each of merchant terminal 510 and customer terminal 516 may take other action in other embodiments.

Note that FIGS. 6A and 6B depict touch inputs, but in some embodiments, other inputs for performing self-test inputs are possible. For example, a user can swipe, provide multiple simultaneous touches, simultaneously swipe, or provide other input or combination of inputs. In addition, in some embodiments, other non-touch inputs may be provided for performing a self-test input, such as when a user interface of merchant terminal 510 and customer terminal 516 is configured to receive non-touch inputs. Such inputs may include voice inputs, user gestures, such as waving or motioning within a field of view of the user interface, providing a fingerprint scan, or other inputs and combinations of inputs.

Figure 7A:
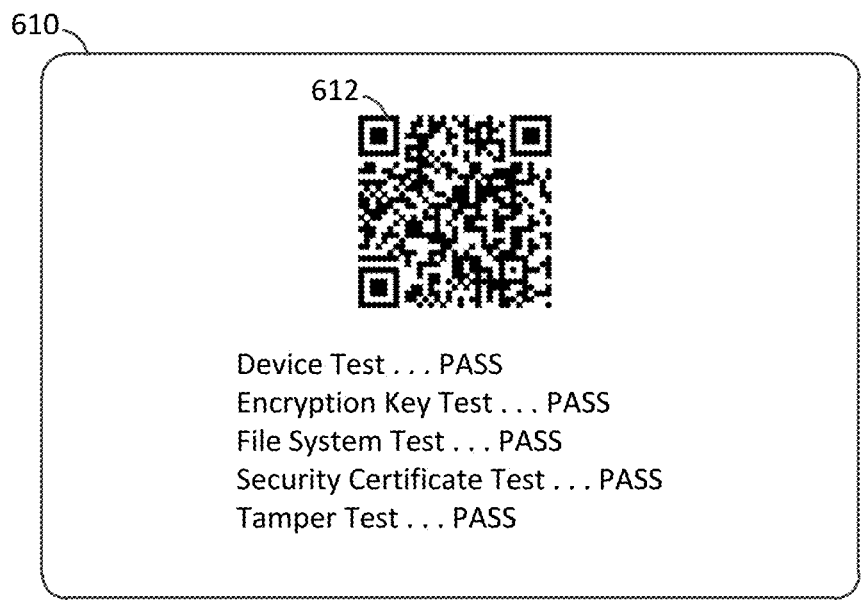
FIG. 7A depicts a front perspective view of a screen of a merchant terminal showing a machine-readable output and a human-readable output on the screen in accordance with some embodiments of the present disclosure.
Figure 7B:
FIG. 7B depicts a front perspective view of a screen of a customer terminal showing a machine-readable output and a human-readable output on the screen in accordance with some embodiments of the present disclosure.

FIGS. 7A and 7B depict front perspective views of screens of a merchant terminal (FIG. 7A) and a customer terminal (FIG. 7B) showing machine-readable and human readable outputs on the screens in accordance with some embodiments of the present disclosure. FIG. 7A depicts an exemplary merchant terminal 610 displaying machine-readable output 612 and human-readable output 622, and FIG. 7B depicts an exemplary customer terminal 614 displaying machine-readable output 616 and human-readable output 624. Each of outputs 612 and 616 may be a machine-readable output displayed in response to a self-test input at merchant terminal 610 or customer terminal 614, as described above. Each of outputs 622 and 624 may be a human-readable output displayed in response to a self-test input at merchant terminal 610 or customer terminal 614, as described above. The outputs 612 and 616 are depicted as QR codes, but other types of machine-readable outputs are possible, such as barcodes and other machine-readable designs. In addition, although a single machine-readable output 612 is displayed at merchant terminal 610 and a single machine-readable output 616 is displayed at customer terminal 614, in some embodiments, other numbers of machine-readable outputs may be provided in response to receiving a self-test input.

As noted above, the outputs of FIGS. 7A and 7B may include information about the respective payment terminal (merchant terminal 610 or customer terminal 614), such as system test results, device hardware, firmware, or software versions, alerts, warnings, or other information. Information indicated by outputs 612 and 616 may be derived via self-tests performed while the device is in secured test mode. The information may be determined and included in the output (e.g., outputs 612, 616, 622, and 624). Outputs 612, 616, 622, and 624 may include other data in other embodiments.

Outputs 612, 616, 622, and 624 may be displayed temporarily for security. For example, in some embodiments, after receiving a self-test input, merchant terminal 610 or customer terminal 614 may be configured to measure an amount of time that the outputs have been displayed. When the amount of time exceeds a pre-determined amount of time, the merchant terminal 610 or customer terminal 614 may be configured to remove (e.g., stop displaying) the outputs. In this regard, limiting an amount of time that the outputs are displayed may be sufficient to thwart attackers by making access temporary. Other techniques for displaying or providing the outputs are possible as described herein.

In some embodiments, following display outputs can be stored in memory at merchant terminal 610 or customer terminal 614 for recall in response to self-test input. In some embodiments, an output may be displayed unaltered upon entry of a self-test input if tests performed in a secured test mode or other information indicates that the information in the outputs have not changed. If such information has changed, merchant terminal 610 or customer terminal 614 may regenerate the outputs to reflect updated information. Other techniques for displaying accurate machine-readable information in response to receipt of a self-test input by merchant terminal 610 or customer terminal 614 are possible.

Figure 8:
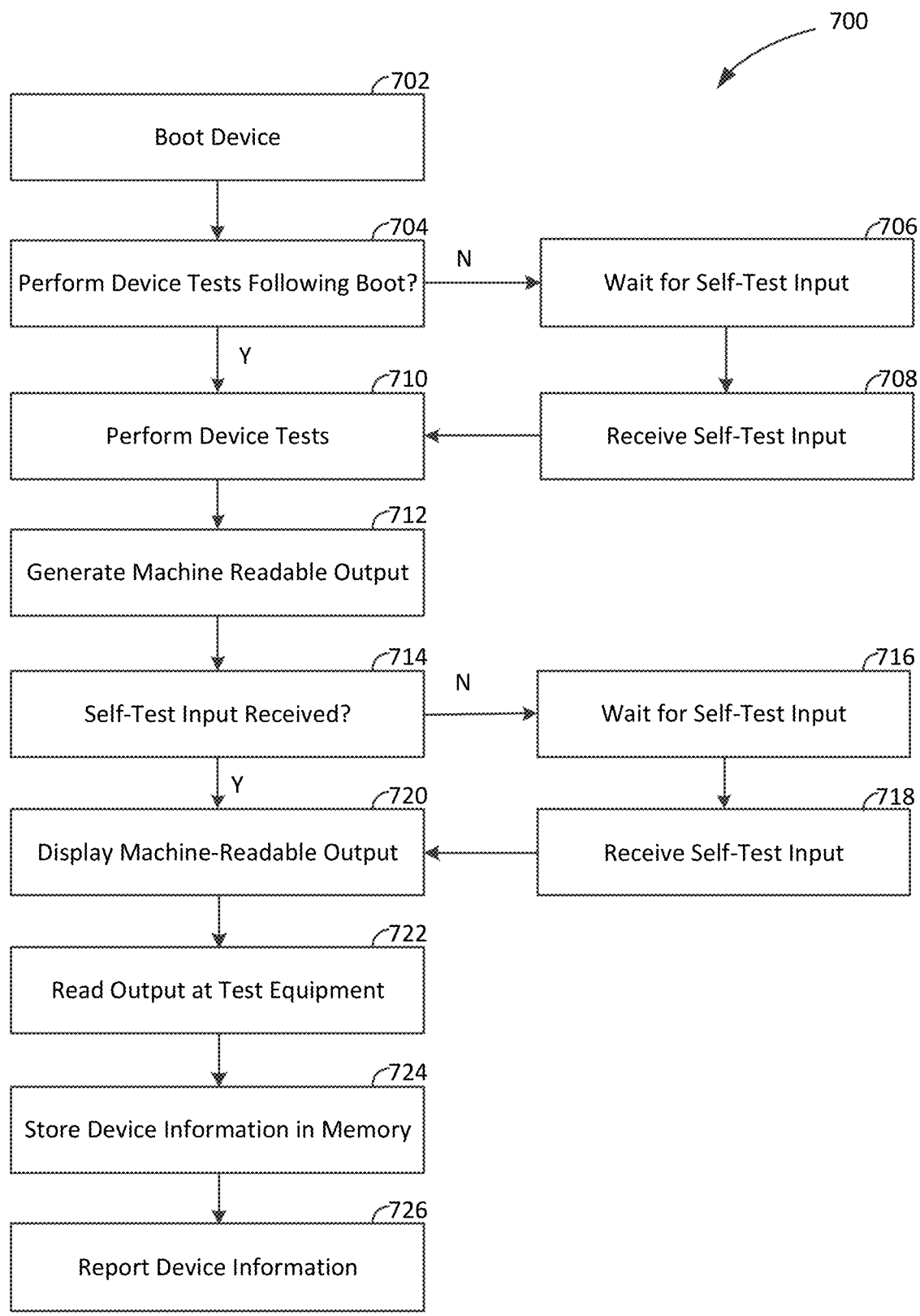
FIG. 8 depicts a non-limiting flow diagram illustrating exemplary steps of a secured test mode for securely verifying information of a point-of-sale system in accordance with some embodiments of the present disclosure.

FIG. 8 depicts a non-limiting flow diagram illustrating exemplary steps of a secured test mode for securely verifying information of a point-of-sale system in accordance with some embodiments of the present disclosure. Although it will be understood that a secured test mode for optical verification of device information may be performed on various devices according to the techniques herein, in an embodiment, secure optical verification of device information may be performed using a secured test mode on a payment terminal (e.g., merchant terminal 110 or customer terminal 112).

At step 702, the payment terminal boots. The boot at step 702 may be a standard payment terminal device boot up, and instructions may be loaded for execution by a processor of the payment terminal. After device boot, processing may continue to step 704.

At 704, the payment terminal may determine whether to perform tests following boot of the device. In some embodiments, the payment terminal may perform self-tests described herein as part of a secured test mode at various times. Whether the payment terminal should enter a secured test mode and performing self-tests may be based on various information, such as instructions stored in memory, a determination of the payment terminal's location (e.g., a manufacturing line or a merchant's location) or other factors. If the payment terminal should wait until a self-test input is received to enter secured test mode and perform system tests, processing may continue to step 706. If payment terminal should enter secured test mode and perform system tests immediately after the payment terminal boots, processing may continue to step 710.

At step 706, the payment terminal waits until it determines that it has received a self-test input, at which time processing continues to step 708. As described herein, the payment terminal may monitor inputs, such as inputs received at a user interface of the payment terminal. The 3 payment terminal may compare inputs at the user interface with inputs corresponding to a self-test input indicated by a pre-defined template. In some embodiments, the pre-defined template identifying a self-test input may be stored in memory at the payment terminal or in other locations accessible by the payment terminal for reference. Note that the template may identify various parameters as part of a self-test input, such as input types and locations. Note also that the template may specify a correlation threshold between inputs received at the payment terminal and inputs corresponding to a self-test input (e.g., a tolerance threshold required to establish that received inputs match self-test inputs in the template). The self-test input received at step 708 may comprise various inputs provided by a user at the payment terminal, such as a touch input at a touchscreen of the payment terminal. The template may specify a self-test input that includes various types and combinations of individual and simultaneous inputs, including taps, touches, presses, swipes or any combination thereof. A self-test input also may include other types of inputs besides touch inputs. When the payment terminal determines that a self-test input has been received, processing may continue to step 710.

At 710, the payment terminal performs device self-tests as part of a secured test mode. As noted herein, such system tests can be various tests for determining device information and information about components (e.g., hardware, firmware, software, etc.) installed on the payment terminal. In some embodiments, the self-tests may comprise a device test, an encryption key test, a file system test, a certificate test, and a tamper system test, as described herein. In some embodiments, a payment terminal may be configured to perform tests of any of its resources as part of self-tests conducted during the secured test mode. After the payment terminal has performed device self-tests, processing may continue to step 712.

At step 712, an output such as a machine-readable output and/or human-readable output may be generated. The output may indicate various information about the device, including self-test results from the secured test mode and other device information. The machine-readable output may be various types of machine-readable output, such as a QR code, barcode, or other machine-readable design. A payment terminal may store the output, such as in memory until it determines that the output should be displayed (e.g., in response to receiving a self-test input). After machine-readable output has been generated, processing may continue to step 714.

At step 714, the payment terminal may determine whether a self-test input authorizing display of the output has been received. If the payment terminal determines that a self-test input have already been received (e.g., at step 708), processing may proceed to step 720. If not, processing may continue to step 716, where payment terminal may wait until it determines that a self-test input has been received at step 716 (e.g., according to the same steps for receiving a self-test input described at step 708 above). After the payment terminal receives a self-test input, processing may continue to step 720.

At step 720, the payment terminal may display the outputs generated at step 712. In some embodiments, payment terminal may display the machine-readable output and/or human-readable output on a touchscreen of the payment terminal, but payment terminal may display the machine-readable output via various output devices in other embodiments. As noted above with regard to FIGS. 7A and 7B, the machine-readable output can be in any of various formats, such as a QR code or a conventional barcode. In some embodiments, the machine-readable output may comprise results of tests, like a device test, an encryption key test, a file system test, a certificate test, a tamper system test, or other tests (e.g., as discussed with regard to FIGS. 3-4). In some embodiments, the payment terminal may display the machine-readable output for a pre-determined period of time or until payment terminal determines that a pre-determined event has occurred, such as when the output is read by test equipment or after user input. After the machine-readable input has been displayed at step 720, processing may continue to step 722.

At step 722 test equipment may read the machine-readable output. In some embodiments, the test equipment can be a device that includes a sensor capable of reading machine-readable output. For example, the test equipment can include a camera, IR sensor, or other device. In some embodiments, a user may manipulate or orient either of the payment terminal or the test equipment so that the test equipment may sense or read the output. The test equipment may perform a scan of the machine-readable output of the payment terminal in response to a user input at the test equipment. In some embodiments, the test equipment may provide an output, such as an audible tone or message for display upon successful scan of the machine-readable output by the test equipment. After the machine readable output has been read at step 722, processing may continue to step 724.

At step 724, test equipment can interpret device information read from output and store the information in memory. For example, data received from the test equipment's scan of the machine-readable output may be stored in memory. As described herein, the data may be stored locally, or transmitted by the test equipment for remote storage. An alert, message, or other information may be generated as part of storage of the data, such as to alert a user of a result of a self-test. In some embodiments, data received at the test equipment may be analyzed as part of the storage, such as to provide a proposed course of action to correct any issues with payment terminal resources identified by self-test results. After the data has been stored, processing may continue to step 726.

At step 726, information from the machine-readable output, such as test results (e.g., pass or fail) or other device information can be reported, such as for analysis or diagnostics use. In some embodiments, the test equipment may include hardware or software for reporting payment terminal information, but the information may be reported or transmitted via other devices in other embodiments. As noted above, a report may be generated as part of storing the information received via machine-readable output and displayed or otherwise provided to a user, such as via a display of the test equipment. In some embodiments, the results of a payment terminal self-test may be reported to a remote server that can analyze, store, or otherwise use the information. Other uses and techniques of information provided via machine-readable output may be possible. After the information has been reported at step 726, processing may end.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A transaction processing device having a plurality of secured communication interfaces and a secured test mode, the transaction processing device comprising:
a first communication interface of the plurality of secured communication interfaces that only communicates with one or more approved servers over a communication network;
a second communication interface of the plurality of secured communication interfaces that only communicates with approved additional transaction processing devices and approved peripheral devices;
a touch screen display;
a memory having instructions stored thereon; and
a processor coupled to the first communication interface, the second communication interface, the touch screen display, and the memory, and that executes the instructions to:
receive, via the touch screen display, a predetermined pattern of inputs;
transition the transaction processing device from a normal operating mode to the secured test mode, in response to receiving the predetermined pattern of inputs, wherein during the secured test mode, the transaction processing device (a) limits communication over the first communication interface and (b) limits communication over the second communication interface;
perform a plurality of system tests, wherein the plurality of system tests comprises a device test, an encryption key test, a file system test, a certificate test, and a tamper system test, and wherein the plurality of system tests are performed during a boot of the transaction processing device;
display, at the touch screen display, a machine-readable output, wherein the machine-readable output comprises results for each of the plurality of system tests; and
transition the transaction processing device from the secured test mode to the normal operating mode and remove the display of the machine-readable output, in response to one of: (1) receiving, via the touch screen display, a second predetermined pattern of inputs, or (2) an elapse of a predetermined amount of time.

2. The transaction processing device of claim 1, wherein the plurality of system tests are performed in response to receiving the predetermined pattern of touch inputs.

3. The transaction processing device of claim 1, wherein the processor further executes the instructions to provide, at the touch screen display in response to receiving the predetermined pattern of touch inputs, a human-readable output comprising results for each of the plurality of system tests.

4. A transaction processing device having a secured test mode, the transaction processing device comprising:
one or more communication interfaces, wherein each of the communication interfaces only communicates with a subset of approved devices for the communication interface;
a user interface;
a memory having instructions stored thereon; and
a processor coupled to the one or more communication interfaces, the user interface, and the memory, and that executes the instructions to:
receive, via the user interface, a predetermined pattern of inputs;
transition the transaction processing device from a normal operating mode to the secured test mode, in response to receiving the predetermined pattern of inputs, wherein during the secured test mode, the transaction processing device limits communication over each of the one or more communication interfaces;
perform a plurality of system tests, wherein the plurality of system tests are performed during a boot of the transaction processing device;
display, at the user interface, a machine-readable output, wherein the machine-readable output comprises results for each of the plurality of system tests; and
transition the transaction processing device from the secured test mode to the normal operating mode and remove the display of the machine-readable output, in response to one of: (1) receiving, via the user interface, a second predetermined pattern of inputs, or (2) an elapse of a predetermined amount of time.

5. The transaction processing device of claim 4, wherein the plurality of system tests are performed in response to receiving the predetermined pattern of inputs.

6. The transaction processing device of claim 4, wherein the plurality of system tests comprises a device test, a software test, and a tamper system test.

7. The transaction processing device of claim 6, where the software test comprises an encryption key test, a file system test, and a certificate test.

8. The transaction processing device of claim 4, wherein the user interface comprises a touch screen, and
wherein the predetermined pattern of inputs comprises a predetermined pattern of touch inputs.

9. The transaction processing device of claim 4, wherein the processor further executes the instructions to provide, at the user interface in response to receiving the predetermined pattern of inputs, a human-readable output comprising results for each of the system tests.

10. The transaction processing device of claim 4, wherein the one or more communication interfaces comprise:
a first communication interface, wherein the approved devices for the first communication interface comprise one or more approved servers; and
a second communication interface, wherein the approved devices for the second communication interface comprise one or more additional transaction processing devices.

11. The transaction processing device of claim 10, wherein the approved devices for the second communication interface further comprise one or more peripheral devices.

12. A method for performing system tests at a transaction processing device having a secured test mode, the method comprising:
receiving, at a user interface of the transaction processing device, a predetermined pattern of inputs;
transitioning the transaction processing device from a normal operating mode to the secured test mode, in response to receiving the predetermined pattern of inputs, wherein during the secured test mode, the transaction processing device limits communication over each of one or more communication interfaces of the transaction processing device;

performing, by a processor of the transaction processing device, a plurality of system tests, wherein the plurality of system tests are performed during a boot of the transaction processing device;

generating, by the processor, a machine-readable output, wherein the machine-readable output comprises results for each of the plurality of system tests;

displaying, at the user interface, the machine-readable output; and transitioning the transaction processing device from the secured test mode to the normal operating mode and removing the display of the machine-readable output, in response to one of: (1) receiving, at the user interface, a second predetermined pattern of inputs, or (2) an elapse of a predetermined amount of time.

13. The method of claim 12, wherein the plurality of system tests are performed in response to receiving the predetermined pattern of inputs.

14. The method of claim 12, wherein the plurality of system tests comprises a device test, a software test, and a tamper system test.

15. The method of claim 14, wherein the software test comprises an encryption key test, a file system test, and a certificate test.

16. The method of claim 12, wherein the user interface comprises a touch screen, and
wherein the predetermined pattern of inputs comprises a predetermined pattern of touch inputs.

17. The method of claim 12, further comprising:
generating, by the processor, a human-readable output, wherein the machine-readable output comprises results for each of the system tests; and
displaying, at the user interface in response to receiving the predetermined pattern of inputs, the human-readable output.

18. The method of claim 12, wherein rejecting any received communications that are not from one of a subset of approved devices for the communication interface comprises:
rejecting, for a first communication interface, any received communications that are not from one or more approved servers; and
rejecting, for a second communication interface, any received communications that are not from one or more additional transaction processing devices or one or more peripheral devices.

19. A non-transitory computer-readable storage medium storing instructions, which when executed by one or more processors of a transaction processing device, cause the one or more processors to perform operations comprising:
receiving, at a user interface of the transaction processing device, a predetermined pattern of inputs;
transitioning the transaction processing device from a normal operating mode to a secured test mode, in response to receiving the predetermined pattern of inputs, wherein during the secured test mode, the transaction processing device limits communication over each of one or more communication interfaces coupled to the one or more processors;

performing a plurality of system tests, wherein the plurality of system tests are performed during a boot of the transaction processing device;

generating a machine-readable output, wherein the machine-readable output comprises results for each of the system tests;

displaying, at the user interface, the machine-readable output; and transitioning the transaction processing device from the secured test mode to the normal operating mode and removing the display of the machine-readable output, in response to one of: (1) receiving, at the user interface, a second predetermined pattern of inputs, or (2) an elapse of a predetermined amount of time.

20. The non-transitory computer-readable storage medium of claim 19, wherein the plurality of system tests are performed in response to receiving the predetermined pattern of inputs.

21. The non-transitory computer-readable storage medium of claim 19, the plurality of system tests comprises a device test, a software test, and a tamper system test.

22. The non-transitory computer-readable storage medium of claim 21, wherein the software test comprises an encryption key test, a file system test, and a certificate test.

23. The non-transitory computer-readable storage medium of claim 19, wherein the user interface comprises a touch screen, and
wherein the predetermined pattern of inputs comprises a predetermined pattern of touch inputs.

24. The non-transitory computer-readable storage medium of claim 19, wherein the instructions, when executed by the one or more processors, further cause the one or more processors to perform operations comprising:
generating a human-readable output, wherein the machine-readable output comprises results for each of the system tests; and
providing, for display at the user interface in response to receiving the predetermined pattern of inputs, the human-readable output.

25. The non-transitory computer-readable medium of claim 19, wherein rejecting any received communications that are not from one of a subset of approved devices for the communication interface comprises:
rejecting, for communications via a first communication interface, any received communications that are not from one or more approved servers; and
rejecting, for communications via a second communication interface, any received communications that are not from one or more additional transaction processing devices or one or more peripheral devices.

* * * * *